Jan. 22, 1963 F. L. CLAYTON 3,074,378
QUICK RELEASE RESTRAINING DEVICE
Filed Sept. 11, 1961 2 Sheets-Sheet 1

INVENTOR
FRED L. CLAYTON

BY Stowell & Stowell

ATTORNEYS

Jan. 22, 1963         F. L. CLAYTON           3,074,378
              QUICK RELEASE RESTRAINING DEVICE
Filed Sept. 11, 1961                    2 Sheets-Sheet 2
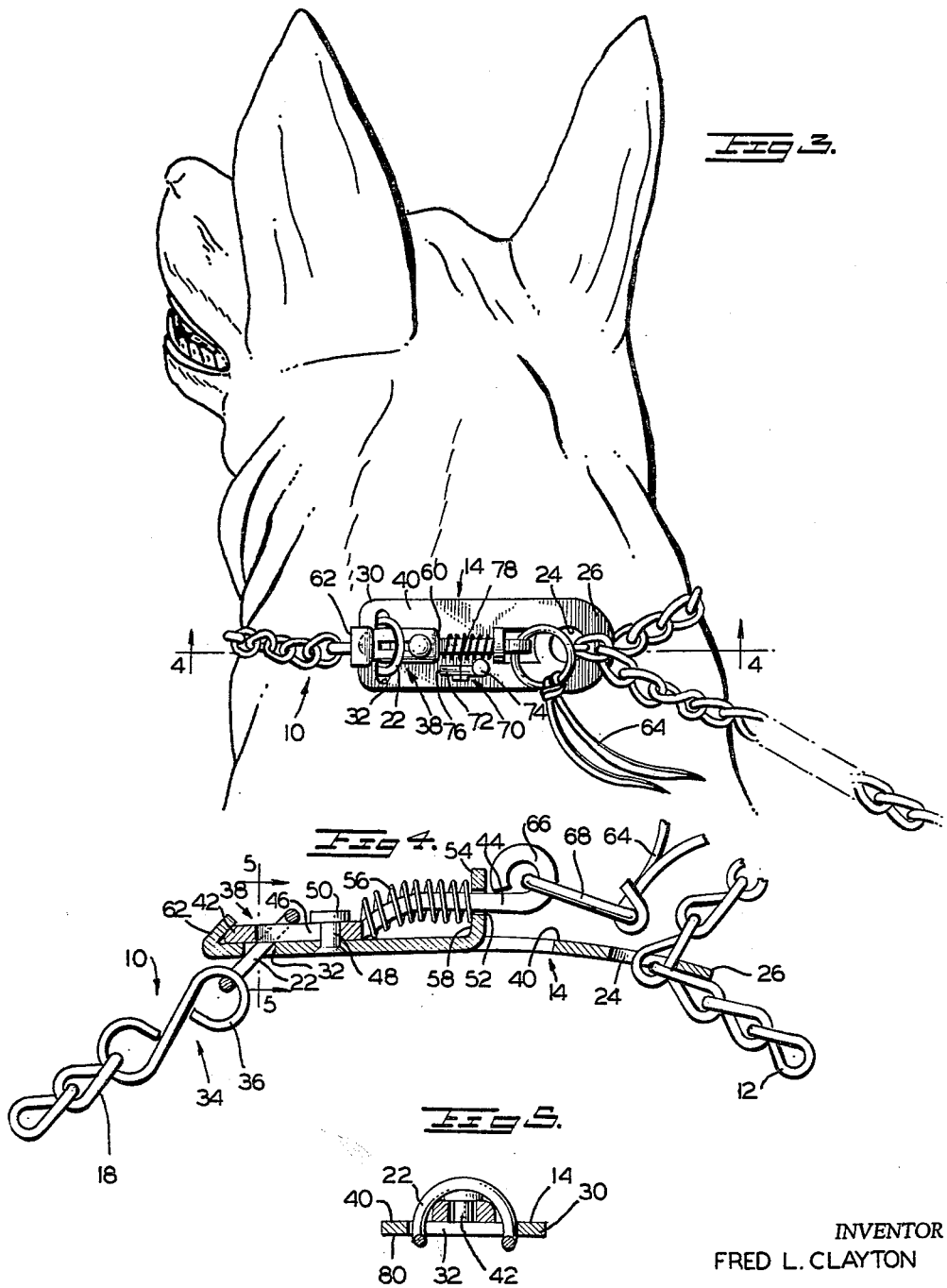
INVENTOR
FRED L. CLAYTON
BY Stowell & Stowell
ATTORNEYS

United States Patent Office 3,074,378
Patented Jan. 22, 1963

3,074,378
QUICK RELEASE RESTRAINING DEVICE
Fred L. Clayton, 2 Walters Court, Fairfax, Va.
Filed Sept. 11, 1961, Ser. No. 137,087
2 Claims. (Cl. 119—111)

This invention relates to a quick release restraining device and in particular to a quick release choker-type collar and leash assembly for dogs whereby a dog may be quickly and completely released from restraint and freed from the choker collar, thereby providing immediate freedom to the restrained animal.

It is a particular object of the present invention to provide an improved quick release restraining device of the choker collar type that is light in weight, relatively inexpensive to manufacture, effective in use and will securely restrain an animal without materially restricting its normal movements.

It is a further object of the present invention to provide such a device including lock means which will prevent accidental operation of the release mechanism to insure against premature release of the animal.

A further object of the present invention is to provide such a device that is adapted to fit animals varying substantially in size.

These and other advantages are obtained by a quick release collar comprising a flexible leash member, releasable neck encircling loop forming means cooperating with said leash member, said loop forming means comprising a plate member having an opening in one end through which said leash member is threadedly received, a keeper link larger than the opening in the plate member secured to one end of the leash member, a latch pin carried at the other end of the plate member and adapted to releasably secure the keeper link to said other end of said plate member, and manually engageable means for moving said latch pin into the keeper link release position.

The invention will be more particularly described with reference to the illustrative embodiments shown in the accompanying drawings in which:

FIG. 3 is an enlarged detailed view of the assembly of the invention applied to the neck of a dog;

FIG. 4 is an enlarged fragmentary sectional view of the quick release restraining device substantially on line 4—4 of FIG. 3; and FIG. 5 is an enlarged fragmentary sectional view substantially on line 5—5 of FIG. 4.

Figure 1:
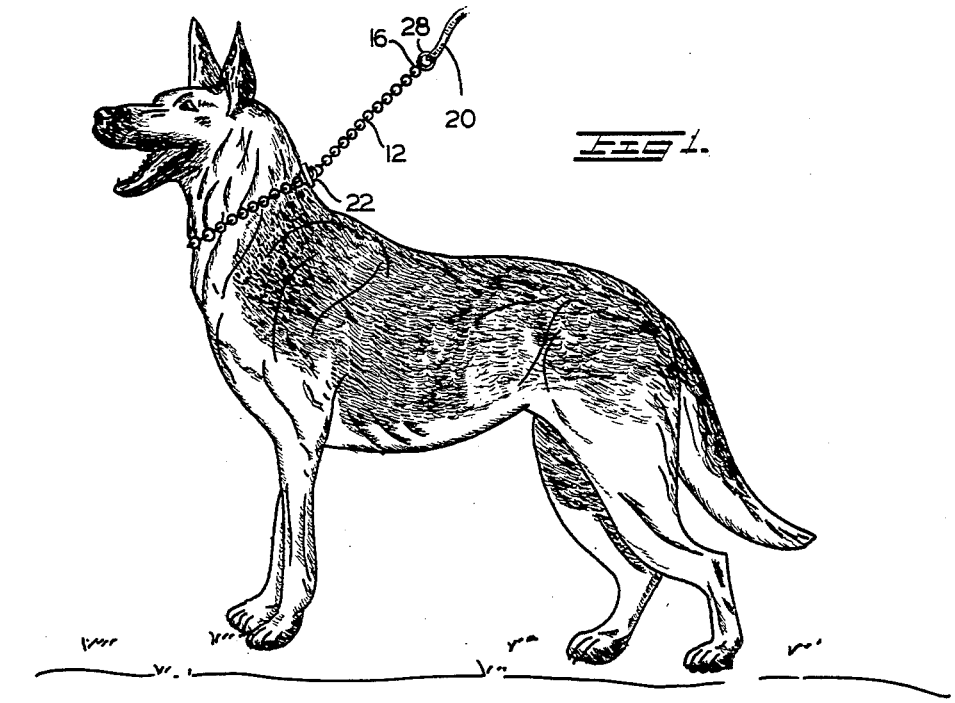
FIG. 1 is a view of the quick release restraining device applied to the neck of a dog.

Referring to the drawings, the quick release animal restraining device is generally designated 10 and includes a flexible leash member 12 and a plate member generally designated 14 which cooperates with the leash member 12 to provide a releasable neck encircling loop forming device.

The leash member 12 is illustrated as a chain having ends 16 and 18. It will be apparent to those skilled in the art from the following detailed description of the invention that the leash member 12 may comprise any suitable flexible draft member such as plural or single strand woven or braided metal, plastic or fibrous elements suitable for constructing conventional leashes.

The end 16 of the leash member 12 is preferably provided with a hand-engaging loop portion 20, while the other end 18 of the leash 12 has secured thereto a keeper link or ring 22.

The length of the leash 12 is not critical as long as it is of sufficient length to encircle the neck of the animal and provide an additional length to position the hand-engaging portion 20 removed from the neck of the dog. It has been found that a length of about two feet between ends 16 and 18 will provide a very satisfactory assembly.

The plate member 14 is provided with an opening 24 adjacent end 26 which opening 24 is of a size to freely receive the leash 12. The leash is threaded through the opening 24 prior to attaching the keeper link or ring 22 to said end 18. The keeper link 22 is larger than the opening 24 in end 26 of the plate member 14 whereby once the leash end 18 is threaded through the opening and the keeper link 22 is attached, the ring in conjunction with the ring member 28, which secures the hand-engaging portion 20 to the leash end 16, prevent unthreading of the leash from the plate member 14.

The opposite end 30 of the plate 14 is provided with an elongated opening 32. The slot 32 is larger than the keeper link 22 whereby the keeper link may be freely slipped through the elongated opening 32 as more clearly illustrated in FIGS. 3, 4 and 5 of the drawings. It will also be noted that by constructing the keeper link 22 in the form of a ring and connecting the ring 22 to the end 18 of the leash by means of a link member 34 engaging the keeper link 22 through a loop portion 36 insertion of the keeper link 22 into the slotted opening 32 is limited by engagement of the loop portion 36 with the undersurface of the plate 14.

A latch bar generally designated 38 is slidably secured to the upper surface 40 of the plate 14. The latch member 38 includes a latch or draw bar portion 42 and an arm portion 44. The draw bar portion 42 is slotted as at 46, which elongated opening receives the shank 48 of an attaching rivet 50. The slot 46 in the bar portion 42 of the latch member and the position of the attaching rivet 50 relative to the slot 32 in end 30 of plate 14 are so selected that the latch member may be moved from a latched position as illustrated, for example, in FIG. 2 to an unlatched position freeing the ring or link member 22 from the plate 14. The extended end 44 of the latch member passes through an opening 52 in a turned-up boss 54 and a suitable spring 56 bears at one end against the inner face 58 of the boss 54 while the opposite end bears against shoulders 60 formed on the latch member 38, thereby normally urging the latch member into the latched position.

The most extended end 42 of the latch member is preferably received under a small upwardly and rearwardly turned boss 62 which aids in preventing accidental release of the keeper link 22. Such disengagement may result from engagement of the forward portion of the latch pin with shrubbery, brush and the like.

Release of the latch link by the animal handler is conveniently provided by thong members 64 which are connected to a ring 68 secured to the loop 66 at the extended end 44 of the latch member. In the illustrated form of the invention, the thongs 64 are relatively short so that they do not interfere with movement of the dog or interfere with proper operation of the release mechanism.

In a preferred embodiment of the present invention, the assembly has a latch release lock member 70 which comprises a bar 72 pivotally mounted to the plate 14 by a pin 74. The member 70 is positioned so that end 76 may be pivoted from an unlocked position as illustrated in FIG. 3 to a latch-lock position wherein the end 76 engages the shoulder 60 on the latch member 38. In the form of the invention illustrated in FIG. 3, the latch-lock member 70 is provided with a thumb-engaging boss 78.

The keeper plate 14 may be curved as more clearly illustrated in FIG. 4 of the drawings so that the plate more nearly conforms to an arcuate portion of an animal's neck. The plate 14 may be cast or formed from metals or plastics or portions thereof may be cast and others formed from sheet or bar stock as is well known in the art.

Figure 2:
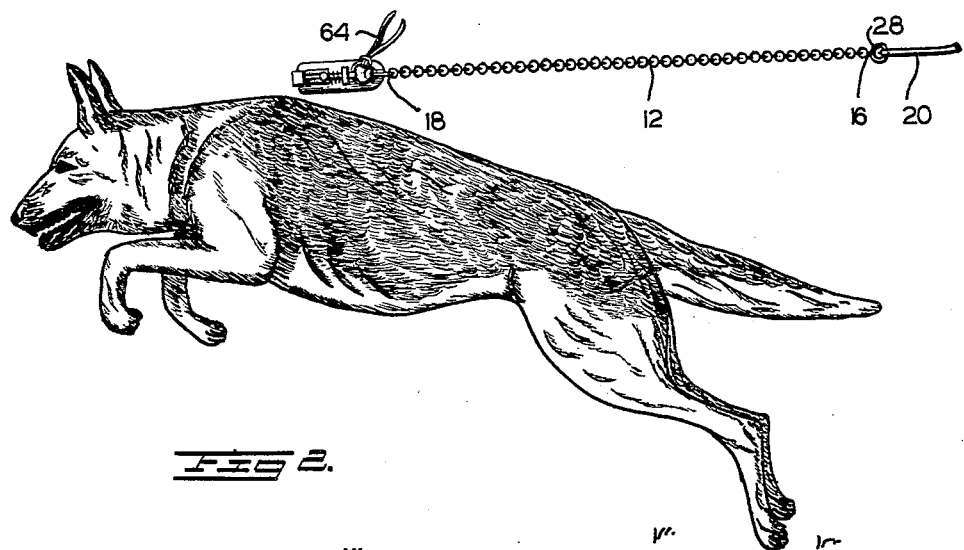
FIG. 2 is a view similar to that shown in FIG. 1 with the restraining device being released from the neck of a dog.

In operation of the device, a length of leash 12 is pulled through the opening 24 in the plate 14 and said end 18 of the leash is brought around the neck of the animal to be restrained. Next, the latch pin is manually urged into the unlatched position against the resilience of spring 56 and the keeper link 22 is pushed through the slotted opening 32 from the lower side 80 of the plate 14 toward the upper surface 40 and when, in this position, the latch member is released so that the latch pin end 42 passes through the opening in the keeper link 22 securing the link 22 to the plate 14. Tension on the hand-engaging end 20 of the leash tightens the loop thus formed in the leash about the animal's neck. Further tension by the animal increases the restraining effect of the choker collar as further leash is drawn through the opening 24 in the plate 14. Relaxing of tension on the leash by the dog releases the tension on the dog's neck as the leash rethreads through the opening 24. When it is desired to release the animal and to free the animal completely from the restraining device, the handler grasps the thongs 64 or the elements 68 or 66 cooperating therewith, urging the members rearwardly, thus freeing the keeper link 22 from its latched engagement with the keeper pin end 42 whereby the restrained animal is free of the handler's leash as illustrated in FIG. 2 of the drawings.

From the foregoing description it will be seen that the present invention provides a quick release choker type restraining device for animals that is simple to operate, light in weight, relatively inexpensive to manufacture and having the further desirable characteristics of being readily locked to insure against accidental release. While the present invention has been shown and described in relation to a preferred embodiment thereof, it will be readily appreciated by those skilled in the art that various modifications may be made therein without departing from the scope of the appended claims.

I claim:
1. A quick release collar comprising a flexible leash member having a first end and a second end, a hand-engaging portion at the first end of said leash member, releasable neck encircling loop forming means cooperating with the second end of said leash member, said loop forming means comprising a plate member having a first end and a second end, an opening in the first end of the plate member through which said leash member is slidably received, a keeper link larger than the opening in the first end of the plate member secured to the second end of said leash member, a latch pin slidably carried at the second end of the plate member, an elongated keeper link receiving opening extending through said plate member at the second end of the plate member in register with the slidable portion of said latch pin, resilient means normally urging said latch pin to the keeper link latching position and when so positioned said plate member, elongated keeper link and said flexible leash member forming an adjustable neck encircling loop, and manually engageable means for moving said latch pin into the keeper link release position against the urging of said resilient means.

2. The invention defined in claim 1 including releasable lock means for constraining said latch pin in said keeper link engaging position.

References Cited in the file of this patent
UNITED STATES PATENTS

| | | |
|---|---|---|
| 1,225,100 | Aubrey | May 8, 1917 |
| 2,331,224 | Pingel | Oct. 5, 1943 |
| 2,616,394 | Elsinger | Nov. 4, 1952 |
| 2,652,809 | Foster | Sept. 22, 1953 |

FOREIGN PATENTS

| | | |
|---|---|---|
| 40,406 | Switzerland | July 24, 1907 |